United States Patent [19]

Beakes et al.

[11] Patent Number: 4,710,085
[45] Date of Patent: Dec. 1, 1987

[54] LAMINATION STACK SELECTION METHOD AND APPARATUS

[75] Inventors: John M. Beakes, Fairborn; Hyman B. Finegold, Dayton, both of Ohio

[73] Assignee: Statomat-Globe, Inc., Dayton, Ohio

[21] Appl. No.: 831,646

[22] Filed: Feb. 20, 1986

[51] Int. Cl.$^4$ ............................................. B65G 59/06
[52] U.S. Cl. ..................................... 414/27; 221/297; 221/310; 414/115; 414/126; 414/786
[58] Field of Search .................. 414/27, 112, 114, 115, 414/126, 786; 29/598, 732, 738; 221/206, 207, 296, 297, 310

[56] References Cited

U.S. PATENT DOCUMENTS

| | | | |
|---|---|---|---|
| 2,875,909 | 3/1959 | Babick et al. | 414/27 |
| 3,926,320 | 12/1975 | Shiuely et al. | 414/114 |
| 4,019,452 | 4/1977 | Rouse | 414/126 X |
| 4,110,895 | 9/1978 | Mitsui . | |
| 4,264,663 | 4/1981 | Beenken . | |
| 4,272,579 | 6/1981 | Mitsui . | |
| 4,383,356 | 5/1983 | Fichtner | 414/114 X |
| 4,439,100 | 3/1984 | Fichtner et al. | 414/115 |

FOREIGN PATENT DOCUMENTS

| | | | |
|---|---|---|---|
| 142111 | 6/1980 | German Democratic Rep. | 29/738 |
| 637236 | 12/1972 | U.S.S.R. | 221/297 |
| 506914 | 5/1976 | U.S.S.R. | 29/738 |
| 743120 | 6/1980 | U.S.S.R. | 29/738 |

OTHER PUBLICATIONS

The Globe Tool & Engineering Co. Drawing N83265-2, titled "Lam. Chute & Clamp Assy.", dated 6-22-85, Notes 1, 2 and 3 on p. 5 of the accompanying Preliminary Amendment and Information Disclosure Statement.

Primary Examiner—Leslie J. Paperner
Attorney, Agent, or Firm—Dybvig & Dybvig

[57] ABSTRACT

A lamination stack selector for supporting a vertical column of laminations in a chute and for selecting a stack of laminations having a predetermined height from the bottom of the column. The selector includes a plurality of support pins biased to a first, column-supporting position, wherein the support pins extend beneath and engage the bottom margin of the column, and movable to a second, column-releasing position, wherein all of the support pins are out of engagement with the bottom margin of the column. When a stack of laminations is to be selected from the lower end of the column, a lamination receptacle is elevated to a position beneath the column. As the lamination receptacle is moved into position to receive a stack of laminations, the support pins are pushed out of supporting engagement with the column by posts moving with the receptacle. The support for the column is thus removed and the column lowers into the receptacle. Thereafter, the receptacle may be lowered. As it lowers, the support pins are biased to return toward their first, column supporting positions. During such return movement, the support pins engage beneath the bottom margin of the column remaining in the chute and forcibly separate any laminations adhered to the bottom of the column.

27 Claims, 13 Drawing Figures

LAMINATION STACK SELECTION METHOD AND APPARATUS

SUMMARY OF THE INVENTION

This invention relates to a lamination stack selection method and apparatus for accumulating stacks of a predetermined height of thin laminations made from iron or other materials of the type used to form cores of dynamoelectric devices, such as motor armatures and stators. However, it will be readily appreciated that this invention may also be used for selecting predetermined numbers or heights of other flat, disc-like workpieces.

The height of a stack of laminations often is critical to the useful completion of the end product, such as an armature. A typical goal of motor manufacturers is that the height of each stack vary from a specified height by no more than the thickness of one lamination. Thus, the need exists for a machine that can form stacks of laminations which are of a predetermined height within close tolerances. Broadly, an object of this invention is to provide an improved method and apparatus for forming stacks of laminations reliably having predetermined height within close tolerances. More particulary, this invention is concerned with machines known as "stack selectors" because they remove, or select, a stack of laminations of a predetermined height from a column of such laminations, and it is an object of this invention to provide an improved method and apparatus for lamination stack selection.

There are various technical difficulties which must be met. Individual laminations often have a non-uniform thickness; they may be dished, curved or otherwise not flat. Accordingly, the upper and lower faces of the individual laminations in a tall, vertical column of laminations may be distinctly not horizontal. Problems in stack selection are also caused by laminations that are stuck together. Laminations often have burrs which cause them to become interlocked. They are usually coated with a tacky lubricant which also causes them to adhere to one another. Laminations are of various thicknesses, ranging from a few thousandths of an inch to one-quarter of an inch or more. Although each lamination may, for example, only be 0.025 inch thick, it is not uncommon that one may elevate a portion of a stack of laminations and carry with it an additional three-eights inch, more or less, of laminations that are adhered to the bottom of the elevated stack.

Although there are several commercially available lamination stack selectors, the need still exists for an improved lamination stack selector which is reasonably inexpensive, reliable, accurate, and fast-operating, in order to meet the needs of modern production lines, and it is a further object of this invention to provide such a selector apparatus.

Many lamination stack selectors are provided with a lamination supply chute or magazine that contains a column of laminations and confines the column to downward movement along a predetermined vertical path. Such stack selectors further include one or more lamination stack-receiving receptacles for receiving a stack of laminations of a predetermined height from the lamination supply chute.

One prior method of selecting a stack of laminations from a column of laminations is to provide a receptacle in a plate that is movable in a direction transverse to the axis of the column. When the receptacle is aligned with the column, the bottom of the column lowers into the receptacle and the plate is then moved in a direction transverse to the axis of the column to shear the lowered part of the column from the remainder of the column. This procedure is often unacceptable, especially for thinner laminations, because the laminations may not cleanly separate and the selector mechanism may become jammed.

Another prior method of stack selection involves utilization of a clamp assembly which clamps against the outer periphery of the lowermost laminations in the chute to thereby support the column in the chute. To select a stack of laminations, a stack-receiving receptacle is located immediately beneath the chute and clamping pressure is released whereupon the lower end of the column of laminations drops into the receptacle. The column is again clamped and the receptacle—now filled with laminations—is lowered. This method is not entirely reliable. There are occasions when some of the laminations may accidentally drop out of the clamp assembly, in which event they may fall loose and potentially cause damage to other machine elements, or they may drop onto the stack of laminations in the receptacle so that the stack is too high. On other occasions, one or more laminations may remain adhered to the lowermost clamped lamination rather than lower with the receptacle so that the stack in the receptacle is too short. Another drawback to this prior method is that the clamp assemblies are usually driven by air cylinders so that there is a potential for loss of air pressure and consequent failure of the clamp assembly. In such event, the entire support for the column is lost and the entire column of laminations may fall loose, which could result in damage to operating machine parts as well as the loss of laminations.

To overcome the problems associated with laminations adhering to one another, some stack selectors of the type described above are provided with a cam operated finger that enters the area immediately beneath the clamp assembly when the the receptacle is lowering to push away any laminations that should have lowered with the receptacle but have remained adhered to the clamped column. Although this approach is often successfully used, it adds to the cost and complexity of the machine, it may add to the time required to complete selection of each stack, and it is not entirely reliable.

This invention provides an improved lamination stack selector for supporting a vertical column of laminations in a chute and for selecting a stack of laminations having a predetermined height from the bottom of the column. The selector of this invention includes a plurality of support pins mounted for movement between a first, column-supporting position, wherein at least most of the support pins extend beneath and engage the bottom margin of the column, to a second, column-releasing position, wherein all of the support pins are out of engagement with the bottom margin of the column. Bias means, which are preferably in the form of coil springs, constantly bias the support pins toward their first, column supporting positions. Therefore, except when selecting laminations from the bottom of the column of laminations, the column is supported by the support pins.

When a stack of laminations is to be selected from the lower end of the column, a lamination receptacle having an upwardly facing lamination-supporting surface upon which laminations may be stacked is moved into a position beneath the column wherein its lamination support surface is aligned with the column and spaced from the bottom of the chute by substantially the desired predetermined height of the stack to be selected. As the lamination receptacle is moved into position to receive a stack of laminations, support pin positioning means carried by the lamination receptacle engages the support pins and pushes them out of supporting engagement with the column. Accordingly, as the lamination receptacle is moved into its lamination stack-receiving position, the support for the column of laminations is removed and the column lowers until its bottom face engages and is thereby supported by the lamination-supporting surface. Immediately thereafter, the lamination receptacle may be lowered. As it lowers, the bias means acting upon the support pins returns them toward their first, column supporting positions. During such return movement, the support pins engage beneath the bottom margin of the column remaining in the chute and forcibly separate any laminations adhered to the bottom of the column.

There are preferably four support pins, spaced equally circumferentially apart relative to the center axis of the column of laminations. In many circumstances, the upper and lower surfaces of the laminations do not lie precisely in horizonatal planes so that not all of the support pins will engage beneath the lowermost lamination in the column. It has been found that, when four support pins are provided, the bottom lamination in a column is almost invariably supported by at least three of the pins.

To enhance the capability of the support pins to forcibly separate the laminations, each of them may advantageously have a sharp, chisel-like edge formed by surfaces joining at acute angles and facing generally toward the center axis of the column of laminations and the support pins are so confined for movement that the aforementioned sharp edges engage the column of laminations as the support pins return to their column-supporting positions. The support pins preferably comprise elongate rods mounted within a mounting block forming the base of the chute for movement downwardly toward the center axis of the column of laminations at an angle of 45 degrees relative to vertical, with their column-supporting end portions lowermost. Accordingly, the lower ends of the support pins returning to strike the column of laminations advantageously engage the column while moving downwardly at an angle of 45 degrees. The bottom surfaces of the support pins may be planar and lie at an angle of 45 degrees relative to the axes of their respective paths of movements so that the bottom surfaces of the support pins are horizontal. Using this construction, the support pins can be pushed out of their column-supporting positions by support pins positioning means in the form of posts carried by the lamination receptacle, the posts having top surfaces which are also horizontal.

Further to enhance the capability of the support pins to forcibly separate the laminations, the bias means acting upon one of the support pins can have greater strength, i.e., apply greater pressure to that support pin, so that, as the support pins strike the column of laminations, unequal forces acting in shear are applied to the column. The added bias may be obtained by using a stronger spring and can also be conveniently applied by an air operated cylinder. This approach has been found to be useful for laminations that quite aggressively adhere to one another.

Other features as well as objects and advantages of the invention will become apparent from the following description and the claims.

BRIEF DESCRIPTION OF THE DRAWINGS

FIG. 1 is a perspective view of a stack of laminations of the general type with which this invention is primarily concerned.

FIG. 3 is a fragmentary cross section of the selector taken on line 3—3 of FIG. 2 and drawn on a slightly larger scale than FIG. 2.

FIG. 4 is a fragmentary cross section of the selector similar to FIG. 3 but showing the parts at a different stage in the operation thereof.

FIG. 5 is a fragmentary cross section of a portion of the selector shown in FIGS. 3 and 4 but on a larger scale.

FIG. 6 is a fragmentary cross section of a portion of the selector taken on line 6—6 of FIG. 5.

DESCRIPTION OF THE PREFERRED EMBODIMENTS

Figure 7:
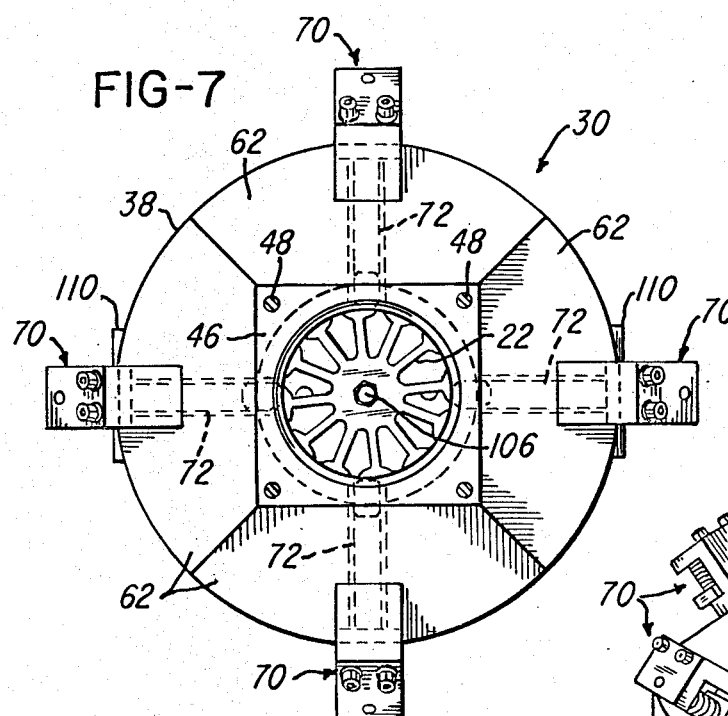
FIG. 7 is a top plan view of the selector taken along line 7—7 of FIG. 3.

FIG. 1 shows a stack of laminations, generally designated 20, formed from plural individual laminations 22, which may be made from iron or other material, and used to form parts of dynamoelectric devices such as stators and rotors. Stack 20 is representative of a stack of laminations that may be used to form a single armature core for an electric motor. Each lamination 22 has a central bore 24 and plural equally circumferentially spaced teeth 26 separating and defining slots 28. It will be noted that the laminations 22 are aligned with one another on a single center axis, but that the lamination teeth 26 are not aligned on top of one another. In later processing steps, typically accomplished by machines in the immediate vicinity of the stack selector, the teeth 26 would be aligned so that the slots 28 would form continuous, although not necessarily straight, slots for receiving coils of insulated wire. The stack 20 thus aligned would then be mounted on an armature shaft by techniques well known in the industry.

Figure 2:
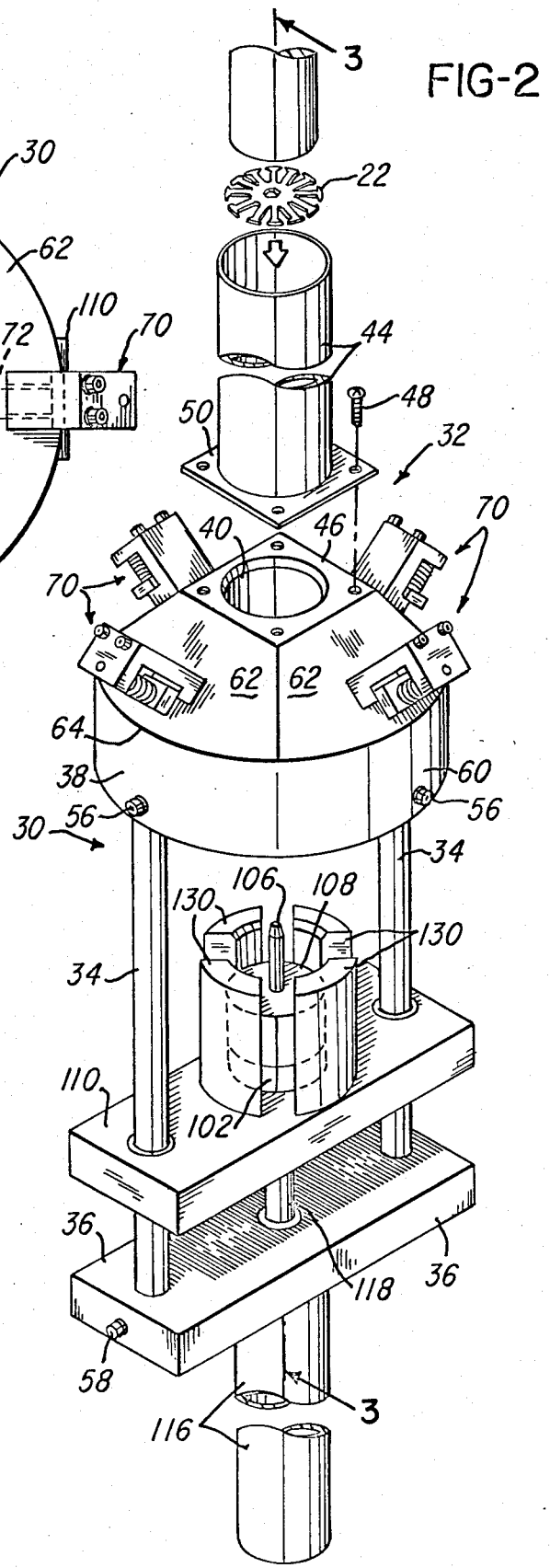
FIG. 2 is an exploded, fragmentary perspective view, with parts broken away, of a lamination stack selector device in accordance with this invention which may be used to produce lamination stacks of the type shown in FIG. 1.

This invention is directed to a lamination stack selector for repeatedly providing stacks of laminations, such as stack 20, each having a predetermined height within close tolerances. FIGS. 2 through 9 illustrate one embodiment of a laminations stack selector, generally designated 30, in accordance with this invention. Referring to FIGS. 2, 3, and 4, the lamination stack selector 30 comprises a chute assembly, generally designated 32, supported by a pair of vertically extending guide rods 34 at a fixed height above a selector base plate 36. Selector base plate 36 may be affixed to the machine bed (not shown). The chute assembly 32 includes a chute base member 38 that comprises a generally cylindrical body member having a circular, central bore 40 adopted to receive a column 42 of laminations 22. Thus, bore 40 confines the column 42 against lateral movement so that the column 42 can only move vertically. The chute assembly 32 further includes a chute extension tube 44 extending coaxially with the bore 40 above the chute base member 38 so that the height of the lamination column 42 is not limited by the height of the chute base member 38.

With reference to FIGS. 2 and 7, the chute extension tube 44 is affixed to the flat, square, top surface, designated 46, of the chute base member 38 by screws 48 extending through apertures in a base flange 50 at the bottom of the tube 44 that are aligned with apertures in the top surface 46 of the chute base 38. As shown best in FIGS. 3 and 4, the upper ends of the guide rods 34 extend into sockets 52 in the flat bottom surface, designated 54, of the chute base member 38, and the base member 38 is affixed thereto by bolts 56. Bolts 58 similarly affix the lower ends of the guide rods 34 in bores in the selector base plate 36.

It may be observed that the chute base member 38 has a lower, outer body surface portion 60 which is cylindrical and an upper, outer body portion formed from four planar sidewalls 62, each joining to an edge of the square top surface 46, sloping outwardly and downwardly at an angle of 45 degrees, and joining to the circular top edge, designated 64, of the lower surface portion 60.

To provide support for the lamination column 42 in the chute assembly 32, four, equally circumferentially or peripherally spaced lamination support and stack selector assemblies, each generally designated 70, are mounted on the chute base member 38. With reference to FIGS. 3,4, and 5, each support and selector assembly 70 comprises a support pin 72 slidably mounted within a bore 74 extending through the chute base 38 and opening both to its bottom surface 54 and to one of its upper sidewalls 62. Each of the pin-receiving bores 74 extends perpendicularly to the upper sidewall 62 to which it opens and at an angle of 45 degrees relative to vertical, so that the support pins 72 are each guided for movement along a path that is 45 degrees relative to vertical. The center axes of the paths of movement of the pins 72 also intersect the axis of the lamination column 42.

Affixed to each of the upper sidewalls 62, as by bolts 76, is a pin guide and spring retainer fitting 78 having parallel inner and outer plate portions, designated 80 and 82, respectively. Each of the support pins 72 projects outwardly of its associated upper sidewall 62 and has a stop plate 84 affixed to its outer end by a bolt 86. The stop plate 84 extends over and adjacent the inner plate portion 80. The outer plate portion 82 has a spring retainer pin 87 aligned with the axis of the support pin 72 and a coil spring 88 is retained between the stop plate 84 and the outer plate portion 82 by the retainer pin 87 and the head of the bolt 86. As apparent, each coil spring 88 biases its associated support pin 72 downwardly and toward the vertical center axis of the column 42.

As illustrated in FIG. 6, each support pin 72 may advantageously be made from square stock, with its corner edges rounded so that it may easily slide within its associated bore 74, which is circular. The upwardly facing side face, designated 90, of each pin 72 abuts an adjacent face of an inner plate portion 80 of the fitting 78, so that the pins 72 are prevented from rotating within the bores 74.

The lower end of each of the support pins 72 has a sharp, chisel-like edge 92 formed by its uppermost side face 90 and its planar bottom surface, designated 94, which join at an acute angle, specifically 45 degrees. The sharp edges 92 face toward the center axis of the lamination column 42, and when in their column-supporting position, as shown in FIGS. 4 and 5, the sharp edges 92 extend slightly beneath the column 42, the bottom margins of which are engaged and supported by the upwardly facing side face 90.

Here it may be observed that the bores 74 for the support pins 72 are so located that the support pins 72 support the column 42 so that its bottom face is substantially coplanar with the bottom face 54 of the chute base 38. Also, the bottom surfaces 94 of the support pins 72 preferably lie at an angle of 45 degrees relative to the axes of their respective paths of movement so that such bottom surfaces 94 are horizontal.

To enable selection of a stack of laminations 20 from the lower end of the column 42, a lamination receptacle, generally designated 100, is provided comprising a receptacle base plate 102, a receptacle spacer plate 104, and a receptacle spindle 106. The spacer plate 104 has an upwardly facing, lamination-supporting surface 108 upon which a stack of laminations 20 may be deposited. It will be understood that the spacer plate 104 may be removed and replaced by other spacer plates (not shown) having different thicknesses, or it may be dispensed with altogether in which case a stack of laminations could be deposited directly on the top face of the receptacle base plate 102. The receptacle 100 is mounted on a vertically movable carriage plate 110, as by bolts 112, and accurately positioned thereon by alignment pins 114. Carriage plate 110 is guided for vertical movement by the guide rods 34 and raised and lowered by an air operated cylinder 116 mounted in depending fashion on the selector base plate 36, and having its piston rod 118 affixed to the carriage plate 110 by a fitting 120.

The receptacle 100 is bounded by support pin positioning means in the form of four arcuately extending, pin-engaging, vertical posts 130, each having a horizontal and planar top surface aligned respectively with the horizontal bottom surface 94 of a support pin 72. For convenience in manufacture, the posts 130 may be made one-piece with the receptacle base plate 102. To select a stack of laminations from the column 42, the receptacle 100 is elevated by the the air cylinder 116 into a position beneath the column 42 wherein its lamination support surface is aligned with the column 42 and spaced from the bottom of the column 42 by substantially the desired predetermined height of the stack 20 to be selected. The elevation of the receptacle 100 may be limited by the engagement of the posts 130 with the bottom surface 54 of the chute base 38, or it may be limited by conventional controls associated with the air cylinder 116.

Figure 8:
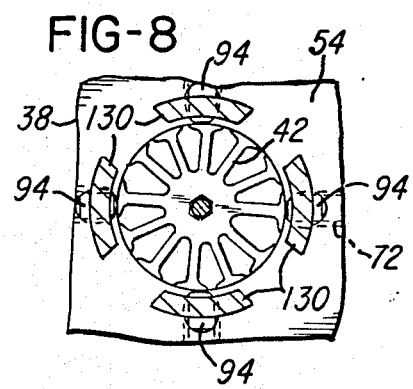
FIG. 8 is a fragmentary cross section of a portion of the selector taken on line 8—8 of FIG. 3.
Figure 9:
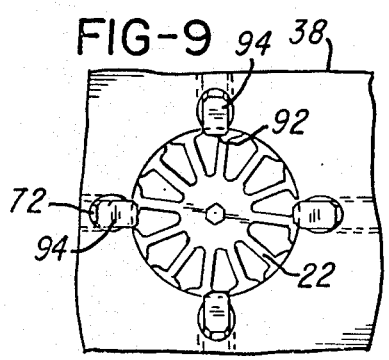
FIG. 9 is a fragmentary cross section of a portion of the selector taken on line 9—9 of FIG. 4.

As the receptacle 100 approaches its uppermost position, shown in FIGS. 3 and 8, the support pin-engaging posts 130 engage the bottom surfaces 94 of the support pins 72 and, upon continued upward movement of the receptacle 100, the posts 130 push the support pins 72 against the bias of the springs 88 out of supporting engagement with the column 42. Thus, as the lamination receptacle 100 is moved into its lamination stack-receiving position, the support for the column of laminations is removed and the column 42 lowers until its bottom face engages and is thereby supported by the lamination-supporting surface 108. The lamination column 42 may be heavy enough to lower of its own accord against any friction it encounters, or a weight 132 may be placed on top of the column 42 to insure that the column 42 fully lowers. The spindle 106 enters the center bore of the column 42 formed by the aligned lamination bores 24 as the receptacle 100 approaches its upper limit of travel to insure that the laminations 22 remain aligned as the column 42 lowers.

Immediately after the column 42 has lowered into the lamination receptacle 100, the receptacle 100 may be lowered by operation of the air cylinder 116 and, as it lowers, the coil springs 88 acting upon the support pins 72 return them toward their initial, column supporting positions. During such return movement of the support pins 72, their chisel-like edges 92 engage beneath the bottom margin of that portion of the column 42 remaining in the chute and forcibly separate any laminations that may remain adhered to the bottom of the column. Accordingly, the receptacle 100 lowers with a stack of laminations 20 of the predetermined height desired.

The stack 20 may be removed from the receptacle 100 by known devices and the foregoing operations repeated to form another stack 20 of the same height. Here it may be noted that plural receptacles, such as the receptacle 100, are often mounted on turrets or the like, and the selection method and apparatus of this invention is readily adaptable for use with turret structures.

Because the entire operation of the stack selector of this invention is controlled by the vertical movements of the receptacle 100, the selector having no other mechanisms requiring synchronization, the selector of this invention may be reliably operated at high speeds, with high accuracy as to the predetermined heights of lamination stacks to be selected due to the use of the support pins 72 which forcibly chisel away any laminations that might otherwise remain adhered to the bottom of the column 42. The support pins 72 also reliably support the column 42 within the chute assembly. Occasionally, because the lamination at the bottom of the column is not substantially horizontal, one of the chisel edges 92 may engage on top of the bottom lamination. However, such lamination will still be retaind by the other three support pins 72. Advantageously, the springs 88 are unlikely to fail in operation. The same is not true for selectors that rely upon air operated clamps or the like that can accidentally drop a column of laminations if there is a loss of air pressure.

Figure 10:
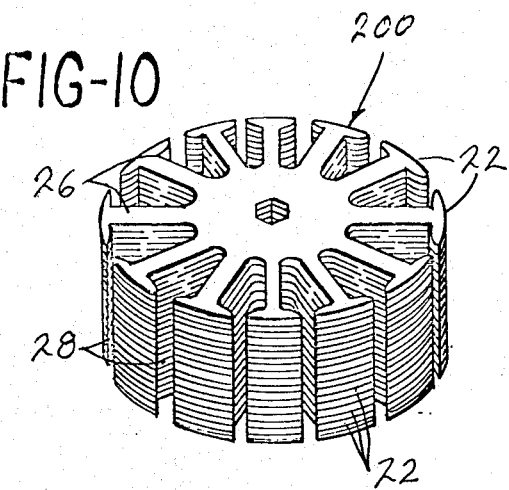
FIG. 10 is a perspective view of another stack of laminations of the general type with which this invention is primarily concerned.
Figure 11:
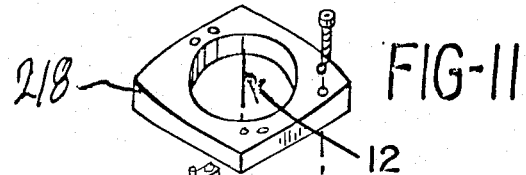
FIG. 11 is an exploded, fragmentary perspective view, with parts broken away, of a second embodiment of a lamination stack selector device in accordance with this invention which may be used to produce lamination stacks of the type shown in FIG. 10.
Figure 12:
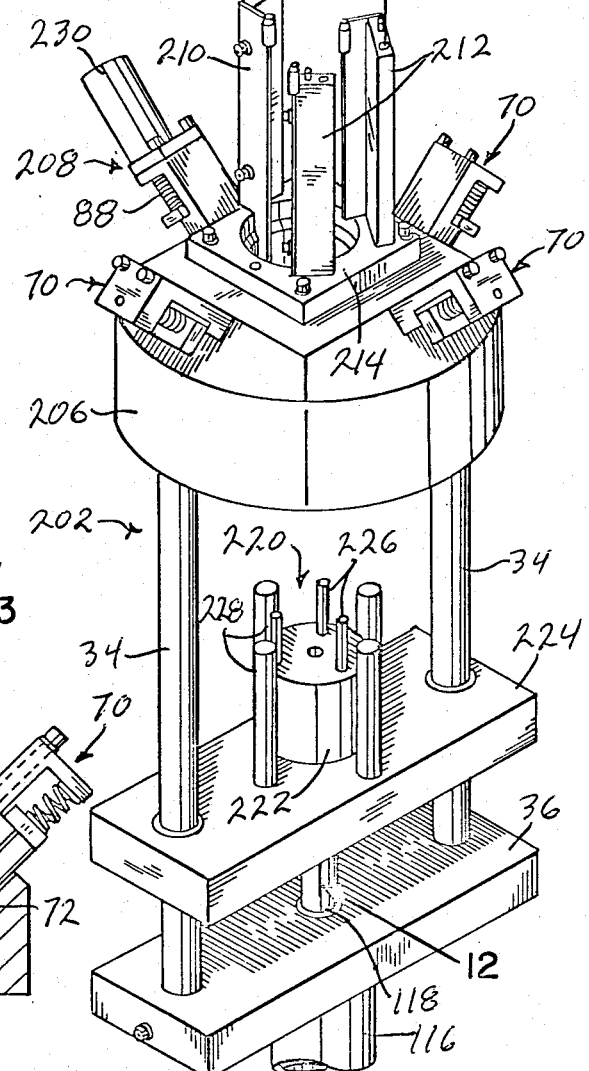
FIG. 12 is a fragmentary cross section of the selector of FIG. 11 taken on line 12—12 of FIG. 11 and drawn on a slightly larger scale than FIG. 11.
Figure 12:
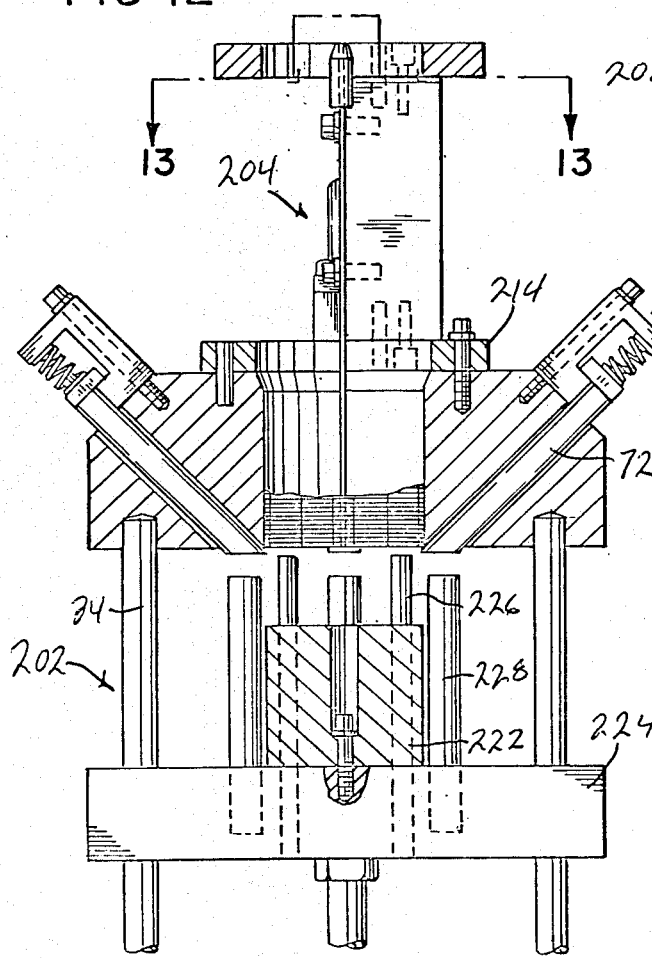
Figure 13:
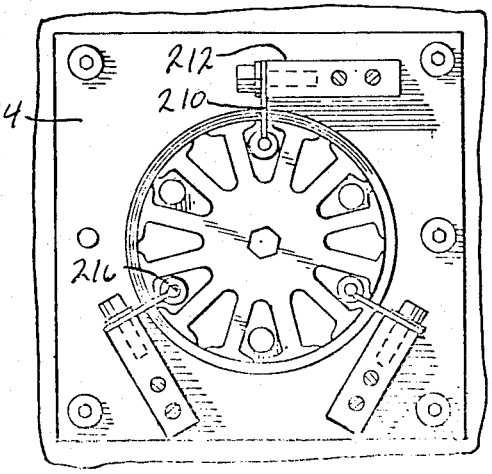
FIG. 13 is a top plan view of the selector taken along line 13—13 of FIG. 12.

FIG. 10 shows another stack, designated 200, of laminations 22, which may be the same as the stack 20 of FIG. 1, except that the laminations of the stack 200 are aligned so that the lamination teeth 26 and slots 28 are vertically aligned, as is preferred by some motor manufacturers. FIGS. 11 to 13 show a modified stack selector, generally designated 202, for forming the stack 200. The operation of the embodiment of FIGS. 11 to 13 is essentially the same as the selector of FIGS. 2 to 9 and a detailed description thereof need not be repeated.

Also, like parts are given like reference numbers for the two embodiments.

In the selector 202, the chute assembly, generally designated 204, has a chute base 206, which differs in shape but functions identically to the chute base 38 of the first embodiment. The chute base 206 provides a mounting for three lamination support and stack selector assemblies 70, which function identically to the previously described assemblies 70, and for a fourth lamination support and stack selector assembly, generally designated 208, that will be described below.

With reference to FIGS. 11 and 13, the chute assembly 204 in FIG. 11 is provided with three sets of vertical alignment blades 210 affixed to support bars 212 mounted on a mounting plate 214 on top of the chute base 206. At least one of the alignment blades 210 extends through the bore of the chute base 206 to assure that the laminations remain aligned. Alignment pins 216 at the top of the alignment blades 210 help guide the laminations into the chute. A top plate 218 is mounted on top of the support bars to add structural integrity.

With reference to FIGS. 11 and 12 selector 202 is provided with a receptacle assembly 220 which also is contructed to maintain the desired alignment of the lamintations in the stack 200. To this end, the receptacle 220 comprises a base member 222 bolted to a receptacle carriage 224 and having three upstanding alignment pins 226 adopted to enter into the coil-receiving slot portions of the stack 200 defined by the aligned lamination slots 28 as the carriage elevates the receptacle toward the chute base 206. In this embodiment, the support pin-engaging vertical posts, designated 228, are round rods mounted directly on the receptacle carriage 224. It is believed apparent that the method of lamination selection is the same in this embodiment as previously described.

Returning to the lamination and stack selector assembly 208, this assembly is the same as each of the assemblies 70, except that, in addition to a coil spring 88, an air cylinder 230 is mounted on a plate 232 on top of its spring retainer fitting 78. The air cylinder 230 is designed to apply a greater biasing force to its associated support pin 72. Accordingly, unequal forces are applied to the column of laminations as the receptacle begins to lower, so that a force operating in shear will assist in removing laminations remaining adhered to the bottom of the column. This construction has been found to be valuable for laminations that adhere strongly to one another.

Although the presently preferred embodiments of this invention have been described, it will be understood that within the purview of this invention various changes may be made within the scop of the following claims.

We claim:
1. Apparatus for supporting a vertical column of laminations in a chute and selecting a stack of laminations having a predetermined height from the bottom if said column, comprising:
a plurality of support pins each having a column-supporting, portion;
means mounting each of said support pins adjacent the lower end of said column for movement between a first, column-supporting position wherein said column-supporting portions of at least most of said support pins extend beneath and engage the bottom margin of said column to a second, column-releasing position wherein all of said column-sup- porting portions are out of engagement with said bottom margin;

lamination receptacle means for receiving and supporting a stack of laminations, said lamination receptacle means having an upwardly facing lamination-support surface upon which laminations may be stacked;

means for moving said lamination receptacle means into and away from a lamination stack-receiving position wherein said lamination-support surface is aligned with said column and spaced from the bottom of said column by substantially said predetermined height;

support pin positioning means moving said support pins out of supporting engagement with said column as said lamination receptacle means is moved into said lamination stack-receiving position so that, when said lamination receptacle means is moved into said lamination stack-receiving position, said column lowers until its bottom face engages and is thereby supported by said lamination-support surface; and means returning said support pins to their respective said first, column-supporting positions as said lamination receptacle means begins to move away from said lamination stack-receiving position so that said support pins engage beneath the bottom of that portion of said column that remains in said chute.

2. The apparatus of claim 1 wherein said support pin positioning means comprise support pin engaging means for engaging said support pins and pushing them out of engagement with said bottom margin of said column.

3. The apparatus of claim 2 wherein said support pin engaging means is affixed to said lamination receptacle means for movement therewith.

4. The apparatus of claim 3 wherein said support pin engaging means projects above said lamination support surface by a distance substantially equal to said predetermined height.

5. The apparatus of claim 4 wherein said support pin engaging means comprises plural vertically extending posts, one for each of said support pins.

6. The apparatus of claim 5 wherein there are four of said support pins.

7. The apparatus of claim 2 wherein said support pin mounting means includes means for guiding each of said support pins for movement along a path unique to that said support pins that has as axis that slopes relative to vertical.

8. The apparatus of claim 7 wherein all of the respective said axes of said paths intersect one another at a point along the vertical axis of said column.

9. The apparatus of claim 7 wherein each of said support pin axes is at an angle of 45 degrees relative to vertical.

10. The apparatus of claim 1 wherein said means returning said support pins comprises bias means biasing said support pins toward their said first, column supporting positions.

11. The apparatus of claim 10 wherein said bias means comprises spring means coacting between said chute and said support pins constantly biasing said support pins toward their said first, column supporting positions.

12. The apparatus of claim 11 wherein there are four of said support pins.

13. The apparatus of claim 12 wherein said means returning said support pins causes said support pins to return with sufficient force to forcibly separate laminations adhered to the bottom of the column supported by said support pins.

14. The apparatus of claim 13 wherein each of said support pins has a sharp edge formed by surfaces joining at acute angles forming wedge members and facing generally toward the center axis of said column to enhance the capability of said support pins to forcibly separate the laminations they engage.

15. The apparatus of claim 14 wherein said means returning said support pins applies unequal forces to at least one of said wedge members so that a shearing force is applied to said column as said wedge members are returned to their said first, column-supporting positions.

16. The apparatus of claim 14 wherein said means returning said support pins comprises bias means biasing said support pins toward said first, column supporting positions.

17. The apparatus of claim 16 wherein said bias means comprises spring means coacting between said chute and said wedge members constantly biasing said support pins toward said first, column suppoting positions.

18. The apparatus of claim 17 wherein said bias means further comprises fluid pressure operated means connected to one of said wedge members for applying a greater force to said one of said support pins than is applied by said spring means to the others of said support pins.

19. The apparatus of claim 18 wherein there are four of said support pins.

20. The apparatus of claim 10 wherein said support pin mounting means includes means for guiding each of said support pins for movement along a path unique to that said support pins that has as axis that slopes relative to vertical.

21. The apparatus of claim 20 wherein all of the respective said axes of said paths intersect one another at a point along the vertical axis of said column.

22. The apparatus of claim 20 wherein each of said support pin axes is at an angle of 45 degrees relative to vertical.

23. The apparatus of claim 1 wherein said support pin mounting means includes means for guiding each of said support pins for movement along a path unique to that said support pins that has as axis that slopes relative to vertical.

24. The apparatus of claim 23 wherein all of the respective said axes of said paths intersect one another at a point along the vertical axis of said column.

25. The apparatus of claim 23 wherein each of said support pin axes is at an angle of 45 degrees relative to vertical.

26. A method of forming a stack having a predetermined height of laminations or the like comprising the steps of:

providing a vertical column of laminations in a chute;

providing a plurality of column support members;

supporting said column by positioning said plurality of column support members at the bottom of said column;

providing lamination receptacle means for receiving and supporting a stack of laminations, said lamination receptacle means having an upwardly facing lamination-support surface upon which laminations may be stacked;

moving said lamination receptacle means into a lamination stack-receiving position wherein said lamination-support surface is aligned with said column and spaced from the bottom of said chute by substantially said predetermined height while simultaneously moving said column support members away from beneath said column so that said column lowers on to said lamination support surface; and lowering said lamination receptacle means while simultaneously returning said column support members to their first mentioned position so that they again engage said column and separate any laminations adhering to the bottom of said column.

27. The method of claim 26 further comprising the step of applying a force to drive one of said column support members that is greater than the force used to drive the other column support members to return them to said first mentiond position so that a shearing force is applied to said column as said column support members are returned to said first mentioned position.

* * * * *